United States Patent
Kamata

(10) Patent No.: US 9,461,476 B2
(45) Date of Patent: Oct. 4, 2016

(54) POWER TRANSMISSION DEVICE AND WIRELESS POWER TRANSMISSION SYSTEM INCLUDING THE SAME

(75) Inventor: Koichiro Kamata, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 768 days.

(21) Appl. No.: 13/300,049

(22) Filed: Nov. 18, 2011

(65) Prior Publication Data

US 2012/0133212 A1     May 31, 2012

(30) Foreign Application Priority Data

Nov. 26, 2010   (JP) ................................. 2010-263048

(51) Int. Cl.
    *H02J 17/00*     (2006.01)
    *H02J 5/00*      (2016.01)

(52) U.S. Cl.
    CPC ..................................... *H02J 5/005* (2013.01)

(58) Field of Classification Search
    CPC ...................................................... H02J 17/00
    USPC ........................................................ 307/104
    See application file for complete search history.

(56) References Cited

U.S. PATENT DOCUMENTS

| | | | |
|---|---|---|---|
| 5,124,699 A | 6/1992 | Tervoert et al. | |
| 5,428,521 A | 6/1995 | Kigawa et al. | |
| 5,790,946 A | 8/1998 | Rotzoll | |
| 6,509,217 B1 | 1/2003 | Reddy | |
| 6,737,302 B2 | 5/2004 | Arao | |
| 6,837,438 B1 | 1/2005 | Takasugi et al. | |
| 7,180,421 B2 | 2/2007 | Pahlaven et al. | |
| 7,209,771 B2 | 4/2007 | Twitchell, Jr. | |
| 7,301,830 B2 | 11/2007 | Takahashi et al. | |
| 7,394,382 B2 | 7/2008 | Nitzan et al. | |
| 8,143,746 B2 * | 3/2012 | Marzetta et al. | ............ 307/104 |
| 8,217,535 B2 * | 7/2012 | Uchida et al. | ................ 307/104 |

(Continued)

FOREIGN PATENT DOCUMENTS

| | | |
|---|---|---|
| EP | 2 372 870 A1 | 10/2011 |
| EP | 2 421 121 A1 | 2/2012 |

(Continued)

OTHER PUBLICATIONS

International Search Report (Application No. PCT/JP2011/077109; PCT14318) Dated Feb. 21, 2012.

(Continued)

*Primary Examiner* — Rexford Barnie
*Assistant Examiner* — Daniel Kessie
(74) *Attorney, Agent, or Firm* — Nixon Peabody LLP; Jeffrey L. Costellia

(57) ABSTRACT

Not a structure in which a resonance frequency of a power transmission device is set after a resonance frequency of a power receiving device is directly measured but a structure in which the resonance frequencies of the power receiving device and the power transmission device are estimated after reflection of an electromagnetic field for transmitting electric power to the power receiving device is monitored by the power transmission device is employed. After a capacitance value of a variable capacitor in a resonance coil of the power receiving device is once set to 0, an S11 parameter is detected while a frequency of an electromagnetic wave is changed, and the resonance frequency of the power transmission device is estimated on the basis of the S11 parameter.

4 Claims, 7 Drawing Sheets

(56) References Cited

U.S. PATENT DOCUMENTS

| | | |
|---|---|---|
| 8,378,524 B2 * | 2/2013 | Mita .................. 307/104 |
| 2002/0049714 A1 | 4/2002 | Yamazaki et al. |
| 2003/0017804 A1 | 1/2003 | Heinrich et al. |
| 2003/0104848 A1 | 6/2003 | Brideglall |
| 2004/0077383 A1 | 4/2004 | Lappetelainen et al. |
| 2004/0128246 A1 | 7/2004 | Takayama et al. |
| 2004/0131897 A1 | 7/2004 | Jenson et al. |
| 2004/0145454 A1 | 7/2004 | Powell et al. |
| 2005/0020321 A1 | 1/2005 | Rotzoll |
| 2005/0215119 A1 | 9/2005 | Kaneko |
| 2005/0254183 A1 | 11/2005 | Ishida et al. |
| 2006/0009251 A1 | 1/2006 | Noda et al. |
| 2007/0216348 A1 | 9/2007 | Shionoiri et al. |
| 2007/0229228 A1 | 10/2007 | Yamazaki et al. |
| 2007/0229271 A1 | 10/2007 | Shionoiri et al. |
| 2007/0229279 A1 | 10/2007 | Yamazaki et al. |
| 2007/0229281 A1 | 10/2007 | Shionoiri et al. |
| 2007/0278998 A1 | 12/2007 | Koyama |
| 2007/0285246 A1 | 12/2007 | Koyama |
| 2010/0244577 A1 | 9/2010 | Shimokawa |
| 2010/0244580 A1 * | 9/2010 | Uchida et al. ............. 307/104 |
| 2010/0259109 A1 | 10/2010 | Sato |
| 2010/0289449 A1 | 11/2010 | Elo |
| 2011/0080053 A1 | 4/2011 | Urano |
| 2011/0095619 A1 | 4/2011 | Urano |
| 2011/0101791 A1 | 5/2011 | Urano |
| 2011/0227421 A1 | 9/2011 | Sakoda et al. |
| 2012/0032521 A1 | 2/2012 | Inoue et al. |

FOREIGN PATENT DOCUMENTS

| | | |
|---|---|---|
| JP | 2010-119246 | 5/2010 |
| JP | 2010-130878 | 6/2010 |
| JP | 2010-193598 | 9/2010 |
| JP | 2010-239690 | 10/2010 |
| JP | 2010-239769 | 10/2010 |
| JP | 2010-252446 | 11/2010 |
| JP | 2010-252468 | 11/2010 |
| WO | WO 2010/055381 A1 | 5/2010 |
| WO | WO 2010/064584 A1 | 6/2010 |
| WO | WO 2010/119577 A1 | 10/2010 |

OTHER PUBLICATIONS

Written Opinion (Application No. PCT/JP2011/077109; PCT14318) Dated Feb. 21, 2012.

* cited by examiner

POWER TRANSMISSION DEVICE AND WIRELESS POWER TRANSMISSION SYSTEM INCLUDING THE SAME

TECHNICAL FIELD

The present invention relates to power transmission devices and wireless power transmission systems including the power transmission devices.

BACKGROUND ART

Various kinds of electronic devices have spread, and a wide variety of products have been shipped to the market. In recent years, portable electronic devices such as cellular phones and digital video cameras have widely spread. Further, electric propulsion moving vehicles that are powered by electric power, such as electric cars, appear on the market as products.

Cellular phones, digital video cameras, and electric propulsion moving vehicles include batteries that are energy storage means. The batteries are charged while being in direct contact with home AC sources that are power transmission means in many cases. In a structure without a battery or a structure where electric power stored in a battery is not used, electric power is directly transmitted to an electronic device from a home AC source through a wiring or the like so that the electronic device operates.

On the other hand, methods by which batteries are charged wirelessly or electric power is transmitted to loads wirelessly have been researched and developed. Typical methods are an electromagnetic coupling method (also referred to as an electromagnetic induction method), a radio wave method (also referred to as a microwave method), and a resonance method. As electronic devices such as small household electrical appliances, devices utilizing the electromagnetic coupling method have spread.

Resonant wireless power transmission systems have been developed in order to increase the efficiency of electric power transmission as disclosed in References 1 to 3.

REFERENCE

Reference 1: Japanese Published Patent Application No. 2010-193598
Reference 2: Japanese Published Patent Application No. 2010-239690
Reference 3: Japanese Published Patent Application No. 2010-252468

DISCLOSURE OF INVENTION

In a resonant wireless power transmission system, as disclosed in Reference 1, it is important that the resonance frequency of a device that receives electric power (hereinafter such a device is referred to as a power receiving device) be consistent with the resonance frequency of a device that transmits electric power (hereinafter such a device is referred to as a power transmission device) in increasing the efficiency of electric power transmission.

In particular, the resonance frequency of the power receiving device is changed depending on arrangement or the like of the power receiving device. Thus, it is important to monitor a change in resonance frequency of the power receiving device by the power transmission device.

However, in the case where the resonance frequency of the power receiving device is measured, the measured value of the resonance frequency is fed back to the power transmission device, and the resonance frequency of the power transmission device is changed, a structure is complex. Reference 3 discloses a specific example in which a structure is complex. In Reference 3, a structure is disclosed in which a circuit for monitoring a change in resonance frequency is provided in each power receiving device. The structure is unfavorable because additional provision of a circuit in each power receiving device leads to an increase in cost. In particular, in transmission using four elements in which electric power is transmitted wirelessly between a first coil (also referred to as a power transmission coil) of a power transmission device and a second coil (also referred to as a power receiving coil) of a power receiving device through a first resonance coil and a second resonance coil by a resonance method, it is unfavorable to provide a means for measuring a resonance frequency in the power receiving device because the size of the power receiving device is further increased.

Thus, it is an object of one embodiment of the present invention to provide a resonant power transmission device with which resonance frequency matching can be performed between resonance coils of the power transmission device and a power receiving device only by a change in design of the structure of the power transmission device and the efficiency of electric power transmission can be increased and a wireless power transmission system including the power transmission device.

One embodiment of the present invention is not a structure in which the resonance frequency of a power transmission device is set after the resonance frequency of a power receiving device is directly measured but a structure in which the resonance frequencies of a power receiving device and a power transmission device are estimated after reflection of an electromagnetic field for transmitting electric power to the power receiving device is monitored by the power transmission device. In particular, in one embodiment of the present invention, the resonance frequency of a power transmission device is estimated under the condition that a capacitance component in a resonance coil of the power transmission device is controlled so as not to influence monitoring of reflection of an electromagnetic wave when the reflection of the electromagnetic wave is monitored. Specifically, after the capacitance value of a variable capacitor in a resonance coil of the power receiving device is once set to 0, an S11 parameter that gives an indication in a scattering matrix (hereinafter referred to as an S parameter) at the time when reflection of an electromagnetic wave for transmitting electric power is monitored is detected while the frequency of the electromagnetic wave is changed, and the resonance frequency of the power transmission device is estimated on the basis of the S11 parameter.

One embodiment of the present invention is a power transmission device that includes a first coil, a first resonance coil, a detector, and a control device. The first coil is connected to a high-frequency power source through a coupler. The first resonance coil is connected to a variable capacitor and is electromagnetically coupled with the first coil, and electromagnetic resonance occurs between the first resonance coil and a second resonance coil that is electromagnetically coupled with a second coil in a power receiving device. The detector detects the intensity of an S11 parameter output from the coupler. The control device has a function of changing the capacitance value of the variable capacitor and the oscillation frequency of a signal output from the high-frequency power source, sets the capacitance value of the variable capacitor to 0, sets a frequency at which the intensity of the S11 parameter is changed at the time when the oscillation frequency of the signal output from the high-frequency power source is changed under the condition that the capacitance value of the variable capacitor is 0, as the resonance frequency of the second resonance coil, sets the resonance frequency of the first resonance coil after the capacitance value of the variable capacitor is set in accordance with the resonance frequency of the second resonance coil, and sets the oscillation frequency of the signal output from the high-frequency power source as the resonance frequencies of the first resonance coil and the second resonance coil.

One embodiment of the present invention is a power transmission device that includes a first coil, a first resonance coil, a detector, and a control device. The first coil is connected to a high-frequency power source through a coupler. The first resonance coil is connected to a variable capacitor and is electromagnetically coupled with the first coil, and electromagnetic resonance occurs between the first resonance coil and a second resonance coil that is electromagnetically coupled with a second coil in a power receiving device. The detector detects the intensity of an S11 parameter output from the coupler. The control device has a function of changing the capacitance value of the variable capacitor and the oscillation frequency of a signal output from the high-frequency power source, sets the capacitance value of the variable capacitor to 0, sets a frequency at which the intensity of the S11 parameter is changed at the time when the oscillation frequency of the signal output from the high-frequency power source is changed under the condition that the capacitance value of the variable capacitor is 0, as the resonance frequency of the second resonance coil, sets the resonance frequency of the first resonance coil after the capacitance value of the variable capacitor is set in accordance with the resonance frequency of the second resonance coil, and sets a frequency at which the intensity of the S11 parameter is changed at the time when the oscillation frequency of the signal output from the high-frequency power source is changed under the condition that the capacitance value of the variable capacitor is set to a capacitance value based on the resonant frequency of the second resonance coil, as the oscillation frequency of the signal output from the high-frequency power source.

In one embodiment of the present invention, the power transmission device may include a memory circuit in which the capacitance value of the variable capacitor for setting the resonance frequency of the first resonance coil on the basis of the resonance frequency of the second resonance coil is stored, and the memory circuit may be connected to the control device.

One embodiment of the present invention is a wireless power transmission system that includes a power transmission device and a power receiving device. The power transmission device includes a first coil, a first resonance coil, a detector, and a control device. The first coil is connected to a high-frequency power source through a coupler. The first resonance coil is electromagnetically coupled with the first coil and is connected to a variable capacitor. The detector detects the intensity of an S11 parameter output from the coupler. The control device has a function of changing the capacitance value of the variable capacitor and the oscillation frequency of a signal output from the high-frequency power source, sets the capacitance value of the variable capacitor to 0, sets a frequency at which the intensity of the S11 parameter is changed at the time when the oscillation frequency of the signal output from the high-frequency power source is changed under the condition that the capacitance value of the variable capacitor is 0, as the resonance frequency of the second resonance coil, sets the resonance frequency of the first resonance coil after the capacitance value of the variable capacitor is set in accordance with the resonance frequency of the second resonance coil, and sets the oscillation frequency of the signal output from the high-frequency power source as the resonance frequencies of the first resonance coil and the second resonance coil. The power receiving device includes the second resonance coil which causes electromagnetic resonance with the first resonance coil and is connected to a capacitor and a second coil which is electromagnetically coupled with the second resonance coil and is connected to a load.

One embodiment of the present invention is a wireless power transmission system that includes a power transmission device and a power receiving device. The power transmission device includes a first coil, a first resonance coil, a detector, and a control device. The first coil is connected to a high-frequency power source through a coupler. The first resonance coil is electromagnetically coupled with the first coil and is connected to a variable capacitor. The detector detects the intensity of an S11 parameter output from the coupler. The control device has a function of changing the capacitance value of the variable capacitor and the oscillation frequency of a signal output from the high-frequency power source, sets the capacitance value of the variable capacitor to 0, sets a frequency at which the intensity of the S11 parameter is changed at the time when the oscillation frequency of the signal output from the high-frequency power source is changed under the condition that the capacitance value of the variable capacitor is 0, as the resonance frequency of the second resonance coil, sets the resonance frequency of the first resonance coil after the capacitance value of the variable capacitor is set in accordance with the resonance frequency of the second resonance coil, and sets a frequency at which the intensity of the S11 parameter is changed at the time when the oscillation frequency of the signal output from the high-frequency power source is changed under the condition that the capacitance value of the variable capacitor is set to a capacitance value based on the resonant frequency of the second resonance coil, as the oscillation frequency of the signal output from the high-frequency power source. The power receiving device includes the second resonance coil which causes electromagnetic resonance with the first resonance coil and is connected to a capacitor and a second coil which is electromagnetically coupled with the second resonance coil and is connected to a load.

In one embodiment of the present invention, in the wireless power transmission system, the power transmission device may include a memory circuit in which the capacitance value of the variable capacitor for setting the resonance frequency of the first resonance coil on the basis of the resonance frequency of the second resonance coil is stored, and the memory circuit may be connected to the control device.

According to one embodiment of the present invention, it is possible to provide a resonant power transmission device with which resonance frequency matching can be performed between resonance coils of the power transmission device and a power receiving device only by a change in design of the structure of the power transmission device and the efficiency of electric power transmission can be increased and a wireless power transmission system including the power transmission device.

BEST MODE FOR CARRYING OUT THE INVENTION

Figure 1:
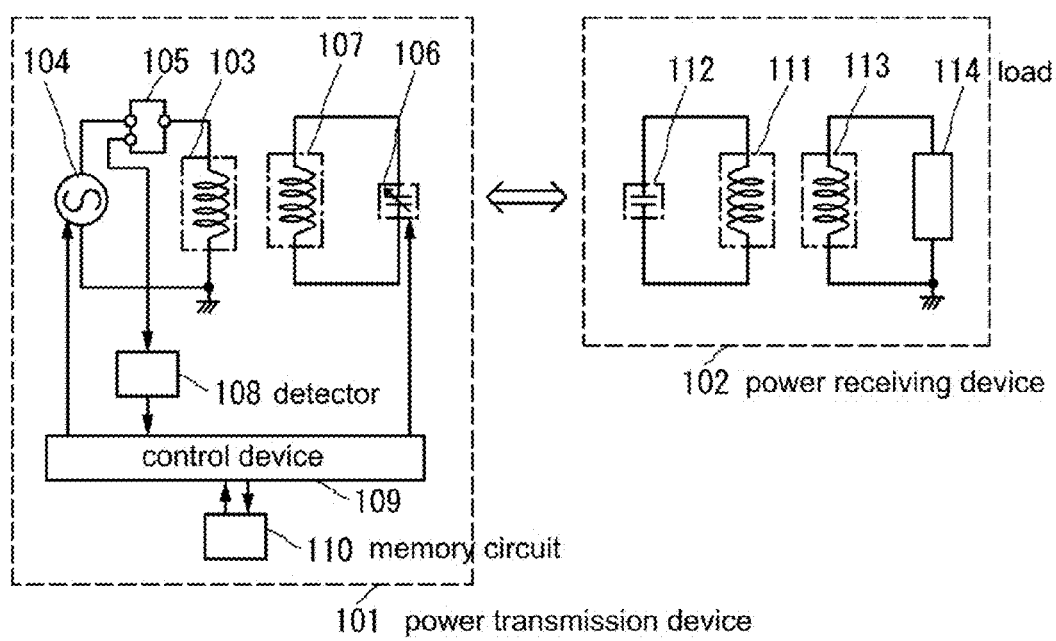
FIG. 1 illustrates a structure in Embodiment 1.

Embodiments of the present invention will be described below with reference to the drawings. Note that the present invention can be implemented in various different ways, and it will be readily appreciated by those skilled in the art that modes and details of the present invention can be modified in various ways without departing from the spirit and scope of the present invention. The present invention therefore should not be construed as being limited to the description of the embodiments. Note that in structures of the invention described below, reference numerals denoting the same portions are used in common in different drawings.

Note that the size, the layer thickness, or the signal waveform of each component illustrated in drawings and the like in embodiments is exaggerated for clarity in some cases. Thus, embodiments of the present invention are not limited to such scales.

Note that in this specification, terms such as "first", "second", "third", and "n-th" (n is a natural number) are used in order to avoid confusion among components and do not limit the number of components.

Embodiment 1

In this embodiment, a resonant wireless power transmission device and a resonant wireless power transmission system in one embodiment of the present invention are described.

FIG. 1 is a block diagram of a power transmission device and a power receiving device. FIG. 1 illustrates electric power transmission with an electromagnetic wave by resonance of a first resonance coil in the power transmission device and a second resonance coil in the power receiving device.

FIG. 1 illustrates a power transmission device 101 and a power receiving device 102. The power transmission device 101 includes a first coil 103 (also referred to as a power transmission coil), a high-frequency power source 104, a coupler 105 (also referred to as a directional coupler), a first resonance coil 107, a variable capacitor 106, a detector 108, a control device 109, and a memory circuit 110.

The power receiving device 102 includes a second resonance coil 111, a capacitor 112, a second coil 113 (also referred to as a power receiving coil), and a load 114.

In FIG. 1, the first coil 103 is connected to the high-frequency power source 104 through the coupler 105. A coil formed by winding of a wire may be used as the first coil 103. The first coil 103 in the power transmission device 101 has higher design flexibility than the second coil 113 in the power receiving device 102 because the position of the power transmission device 101 is not particularly limited in comparison with the position of the power receiving device 102.

Note that when it is explicitly described that "A is connected to B", the case where A is electrically connected to B, the case where A is functionally connected to B, and the case where A is directly connected to B are included.

In FIG. 1, the high-frequency power source 104 is a power supply circuit for outputting a signal whose frequency is successively changed in accordance with control by the control device 109.

Note that the high-frequency power source 104 may include a voltage controlled oscillator (VCO) or the like so that the frequency of an output signal is changed in accordance with voltage input from the control device 109.

There is no particular limitation on a frequency which is oscillated with an AC signal output from the high-frequency power source 104 in the power transmission device 101 in this embodiment (such a frequency is referred to as an oscillation frequency), and an oscillation frequency at which electric power can be transmitted by a resonance method may be used. The oscillation frequency of a power transmission electromagnetic wave can be used, for example, in the frequency range of several kilohertz to several gigahertz. In particular, in this embodiment, in terms of transmission efficiency, the frequency range of several megahertz is preferable because resonance (magnetic resonance) can be caused.

In FIG. 1, the coupler 105 (the directional coupler) is a circuit for detecting an S parameter in the circuit including the high-frequency power source. In this embodiment, the coupler 105 detects an S11 parameter that gives an indication of loss due to reflection between a two-terminal port of the first coil 103 and a two-terminal port of the second resonance coil 111.

In FIG. 1, the first resonance coil 107 is connected to the variable capacitor 106. A coil formed by winding of a wire may be used as the first resonance coil 107. There is no particular limitation on the shape of the first resonance coil 107; however, the first resonance coil 107 in the power transmission device 101 has higher design flexibility than the second resonance coil 111 in the power receiving device 102 because the position of the power transmission device 101 is not particularly limited in comparison with the position of the power receiving device 102. Note that signals for supplying electric power wirelessly are transmitted and received between the first coil 103 and the first resonance coil 107 by electromagnetic coupling. In addition, signals for supplying electric power wirelessly are transmitted and received between the first resonance coil 107 and the second resonance coil 111 by electromagnetic resonance. Electromagnetic resonance is used in resonant wireless power transmission. By electromagnetic resonance, electric power which is higher than electric power generated by electromagnetic coupling can be transmitted within a distance of 1 m or less from an electric field or a magnetic field.

In FIG. 1, the variable capacitor 106 may be, for example, a variable capacitance diode utilizing the spread of a depletion layer due to a semiconductor material so that capacitance is changed by voltage applied from the outside. Alternatively, the variable capacitor 106 may be micro electro mechanical systems (MEMS) so that capacitance is changed by voltage applied from the outside.

In FIG. 1, the detector 108 detects the intensity of the S11 parameter obtained in the coupler 105. Specifically, the detector 108 is a circuit which converts the intensity of the S11 parameter that is an analog value into a digital value and transmits the intensity of the S11 parameter that is the digital value to the control device 109.

In FIG. 1, the control device 109 has a function of changing the capacitance value of the variable capacitor 106 and the oscillation frequency of a signal output from the high-frequency power source 104. The control device 109 performs a plurality of different operations.

Specifically, the control device 109 has a function of adjusting the capacitance value of the variable capacitor 106 to 0. Further, the control device 109 has a function of adjusting voltage to be applied to the high-frequency power source 104 so that the oscillation frequency of the high-frequency power source 104 is successively changed under the condition that the capacitance value of the variable capacitor 106 is 0.

Note that in this specification, the expression "the capacitance value of the variable capacitor 106 is set to 0" means that the capacitance value of the variable capacitor 106 is set such that the first resonance coil 107 does not influence signals transmitted and received between the first coil 103 and the second resonance coil 111.

Note that when the oscillation frequency of the high-frequency power source 104 is successively changed under the condition that the capacitance value of the variable capacitor 106 is 0, the S11 parameter obtained in the coupler 105 is changed in accordance with a change in oscillation frequency of the high-frequency power source 104. In the following description, a peak frequency at which the S11 parameter obtained by a successive change in oscillation frequency of the high-frequency power source 104 under the condition that the capacitance value of the variable capacitor 106 is 0 is changed is referred to as f0. Note that the frequency f0 detected by the control device 109 can be estimated as the resonance frequency of the second resonance coil 111.

Figure 2:
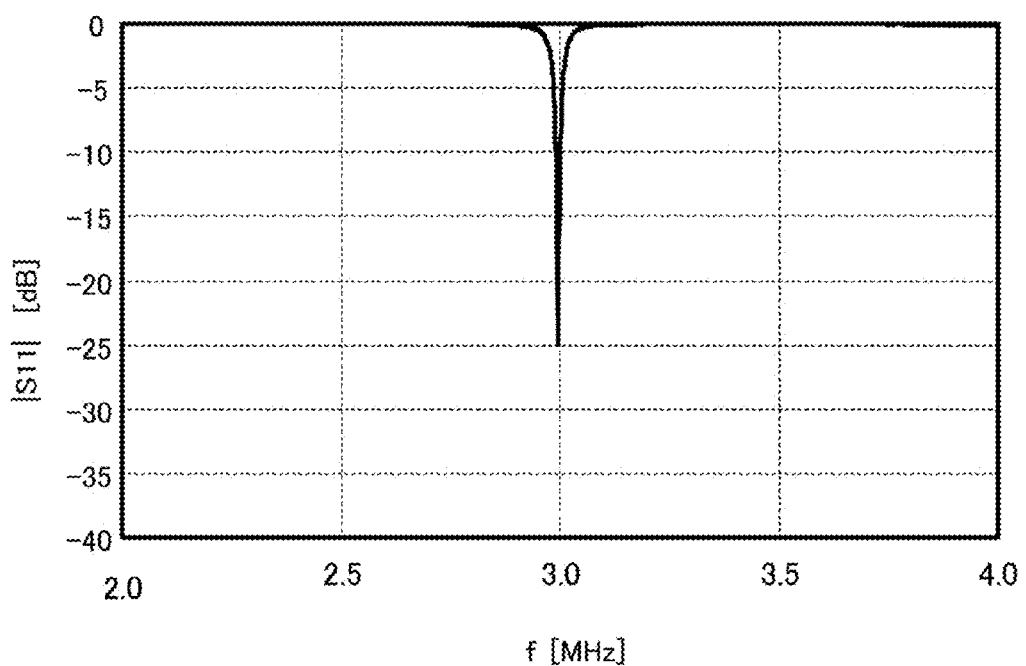
FIG. 2 shows a structure in Embodiment 1.

FIG. 2 is a graph in which the horizontal axis represents the oscillation frequency of the high-frequency power source 104 and the vertical axis represents the intensity of the S11 parameter that is obtained in the detector 108. Specifically, a frequency f represents the intensity (dB) of a magnetic field that indicates the intensity of the S11 parameter while the frequency f is changed from 2.0 to 4.0 MHz.

In FIG. 2, the peak frequency f0 at the time when the intensity of the S11 parameter that is obtained in the detector 108 is changed is estimated at 3 MHz. In other words, when the oscillation frequency is 3 MHz, the intensity of the S11 parameter is low and power loss due to reflection between the first coil 103 and the second resonance coil 111 is low.

Note that in this specification, "the peak frequency at the time when the intensity of the S11 parameter is changed" is a frequency at the time when the intensity of the S11 parameter is markedly decreased in successively changing the oscillation frequency and then is rapidly returned to the original intensity, as illustrated in FIG. 2. Note that the peak frequency at the time when the intensity of the S11 parameter is changed might be referred to as "a frequency at which the intensity of the S11 parameter is changed".

Figure 3:
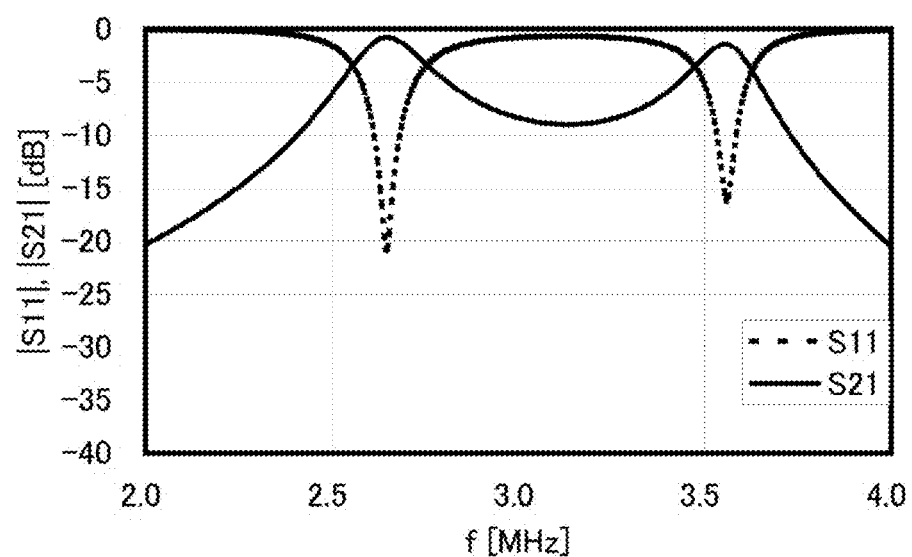
FIG. 3 shows a structure in Embodiment 1.

Note that FIG. 3 is a graph in which the horizontal axis represents the oscillation frequency of the high-frequency power source 104 and the vertical axis represents the intensity of magnetic fields of the S11 parameter and an S21 parameter that are obtained in the coupler 105 in the case where electromagnetic resonance occurs between the first resonance coil 107 and the second resonance coil 111. The S21 parameter gives an indication of the efficiency of electric power transmission in the S parameter.

As is clear from FIG. 3, the frequencies f0 at which the S11 parameter obtained in the detector 108 is changed are estimated at around 2.6 MHz and 3.6 MHz. In other words, power loss due to reflection is low when the oscillation frequencies are 2.6 MHz and 3.6 MHz. Similarly, the frequencies f0 at which the S21 parameter is changed are estimated at around 2.6 MHz and 3.6 MHz. FIG. 3 shows that the peak of the S11 parameter is consistent with the peak of the S21 parameter. That is, the efficiency of electric power transmission is high when the oscillation frequencies are 2.6 MHz and 3.6 MHz. In other words, when the frequency f0 is obtained by monitoring of a change in oscillation frequency of the S11 parameter, a frequency with high efficiency of electric power transmission, i.e., the resonance frequency of the second resonance coil 111 can be estimated.

Further, the control device 109 has a function of changing the capacitance value of the variable capacitor 106 into a value based on the frequency f0 after the frequency f0 is detected. Furthermore, the control device 109 has a function of fixing the oscillation frequency of the high-frequency power source 104 to the frequency f0 while the capacitance value of the variable capacitor 106 is set to the value based on the frequency f0.

In FIG. 1, the memory circuit 110 stores a look-up table in which voltage for adjusting the capacitance of the variable capacitor 106 by the control device 109 is estimated in advance in order that the control device 109 adjust the resonance frequency of the first resonance coil 107 in accordance with the frequency f0 that is the resonance frequency of the second resonance coil 111.

In FIG. 1, a coil formed by winding of a wire may be used as the second resonance coil 111. There is no particular limitation on the shape of the second resonance coil 111; however, the second resonance coil 111 in the power receiving device 102 is preferably designed such that it is smaller than the first resonance coil 107 in the power transmission device 101 because the power receiving device 102 needs to be smaller than the power transmission device 101. In particular, the Q-value of the second resonance coil 111 is preferably high. Specifically, the Q-value of the second resonance coil 111 is preferably 1000 or more. Note that signals for supplying electric power wirelessly are transmitted and received between the second resonance coil 111 and the first resonance coil 107 by electromagnetic resonance.

Although FIG. 1 illustrates the capacitor 112, the capacitor 112 may be parasitic capacitance generated at the time of formation of the second resonance coil 111. Alternatively, the capacitor 112 may be a capacitor provided in advance independently of the second resonance coil 111.

In FIG. 1, a coil formed by winding of a wire may be used as the second coil 113. There is no particular limitation on the shape of the second coil 113; however, the second coil 113 in the power receiving device 102 is preferably designed such that it is smaller than the first coil 103 in the power transmission device 101 because the power receiving device 102 needs to be smaller than the power transmission device 101. Note that signals for supplying electric power wirelessly are transmitted and received between the second coil 113 and the second resonance coil 111 by electromagnetic coupling.

In FIG. 1, the load 114 needs to operate by wireless power transmission. For example, a battery, an electric motor, or the like can be used. Specifically, an electronic device which operates by a battery, such as a cellular phone, or an electric propulsion moving vehicle can be used. Note that in the power receiving device 102, a circuit such as a DCDC converter or a rectifier circuit for converting AC voltage transmitted to the second coil 113 into DC voltage used in the load 114 may be provided between the load 114 and the second coil 113.

Figure 4:
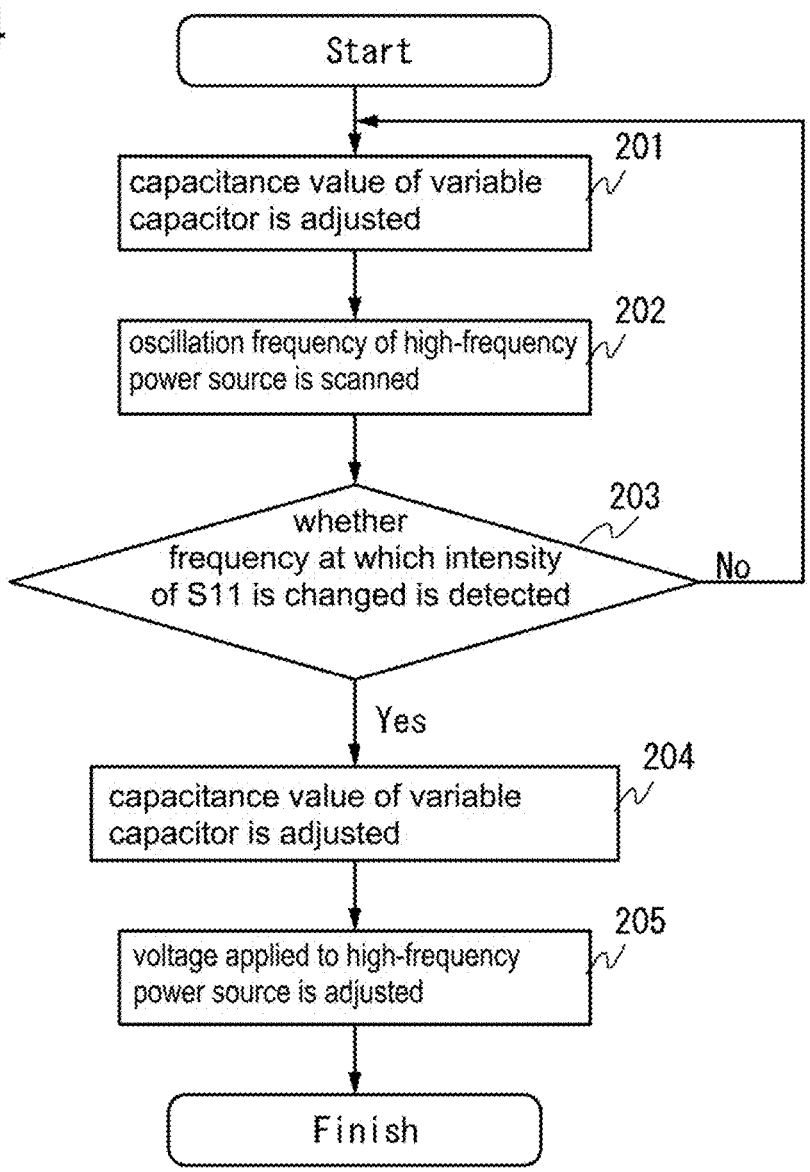
FIG. 4 illustrates a structure in Embodiment 1.
Figure 5A:
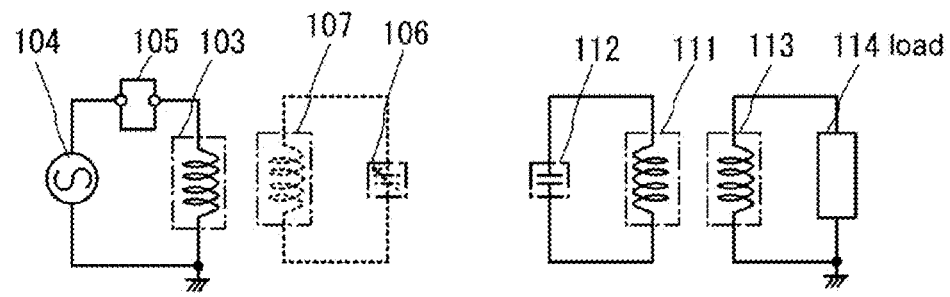
FIGS. 5A to 5C illustrate structures in Embodiment 1.
Figure 5B:
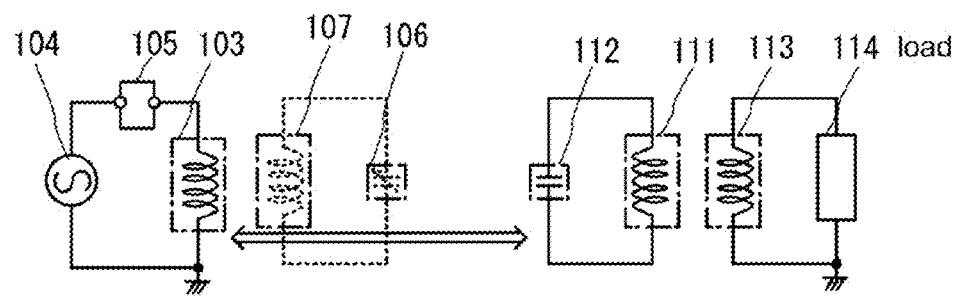
Figure 5C:
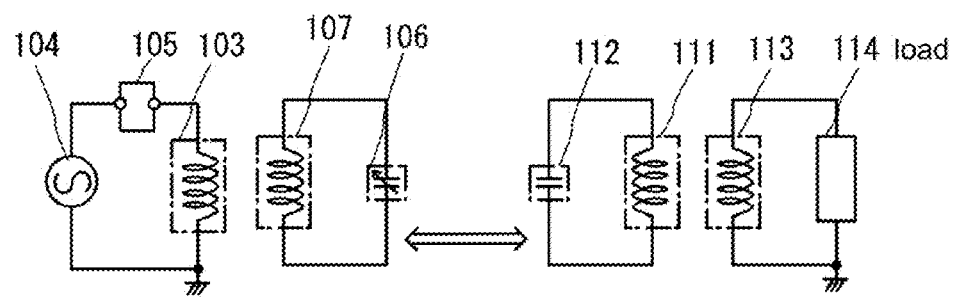

FIG. 4 is a flow chart of a wireless power transmission system in the present invention. FIGS. 5A to 5C are schematic diagrams in the flow chart in FIG. 4.

In Step 201 in FIG. 4, in the power transmission device 101, the capacitance value of the variable capacitor 106 is adjusted to 0 by control with the control device 109. In other words, in Step 201 in FIG. 4, as illustrated in the schematic diagram in FIG. 5A, the variable capacitor 106 and the first resonance coil 107 (dotted lines in the diagram) are not to be influenced by a signal output from the first coil 103.

In Step 202 in FIG. 4, in the power transmission device 101, the oscillation frequency of the high-frequency power source 104 is scanned by control with the control device 109 so that the oscillation frequency of the high-frequency power source 104 is changed successively.

In Step 203 in FIG. 4, in the power transmission device 101, whether the frequency f0 at which the intensity of the S11 parameter is changed is detected in the control device 109 when the oscillation frequency of the high-frequency power source 104 is changed successively is determined. In Step 203, if the frequency f0 is not detected, rearrangement of a power receiving device or the like by a user is required, and the steps are performed again from Step 201. In other words, in Steps 202 and 203 in FIG. 4, as illustrated in the schematic diagram in FIG. 5B, a frequency at which power loss due to reflection between the first coil 103 and the second resonance coil 111 is decreased is determined while the variable capacitor 106 and the first resonance coil 107 (dotted lines in the diagram) are not influenced by a signal output from the first coil 103. Through the series of steps, the frequency f0 is detected.

In Step 204 in FIG. 4, if the frequency f0 is detected in Step 203, the capacitance value of the variable capacitor is adjusted in accordance with the frequency f0. The capacitance value of the variable capacitor 106 may be adjusted referring to the look-up table stored in the memory circuit 110. The look-up table stores application voltage based on the capacitance value of the variable capacitor 106 adjusted in accordance with the frequency f0 that is a resonance frequency estimated in advance.

In Step 205 in FIG. 4, in the power transmission device 101, voltage to be applied to the high-frequency power source 104 is adjusted by control with the control device 109 so that the frequency f0 is set as the oscillation frequency of the high-frequency power source 104. In other words, in Steps 204 and 205 in FIG. 4, as illustrated in the schematic diagram in FIG. 5C, resonance frequency matching is performed so that resonance occurs between the first resonance coil 107 and the second resonance coil 111 by application of voltage to the variable capacitor 106, and output from the high-frequency power source 104 whose oscillation frequency is the frequency f0 is obtained.

According to one embodiment of the present invention, it is possible to provide a resonant power transmission device with which resonance frequency matching can be performed between resonance coils of the power transmission device and a power receiving device only by a change in design of the structure of the power transmission device and the efficiency of electric power transmission can be increased and a resonant wireless power transmission system.

This embodiment can be combined with any of the structures described in the other embodiments as appropriate.

Embodiment 2

In this embodiment, the case where different steps are added to the flow chart in FIG. 4 in Embodiment 1 is described.

Note that the control device 109 in FIG. 1 in Embodiment 1 that is described in this embodiment has a function of changing the capacitance value of a variable capacitor and the oscillation frequency of a signal output from a high-frequency power source. Specifically, the control device 109 has a function of adjusting the capacitance value of the variable capacitor 106 to 0. Further, the control device 109 has a function of adjusting voltage to be applied to the high-frequency power source 104 so that the oscillation frequency of the high-frequency power source 104 is successively changed under the condition that the capacitance value of the variable capacitor 106 is 0. Further, the control device 109 has a function of changing the capacitance value of the variable capacitor 106 into a value based on the frequency f0 in accordance with the frequency f0 after the frequency f0 is detected. Furthermore, the control device 109 has a function of setting a frequency at which the intensity of the S11 parameter is changed at the time when the oscillation frequency of the signal output from the high-frequency power source is changed while the capacitance value of the variable capacitor 106 is set to the value based on the frequency f0, as the oscillation frequency of the signal output from the high-frequency power source.

Figure 6:
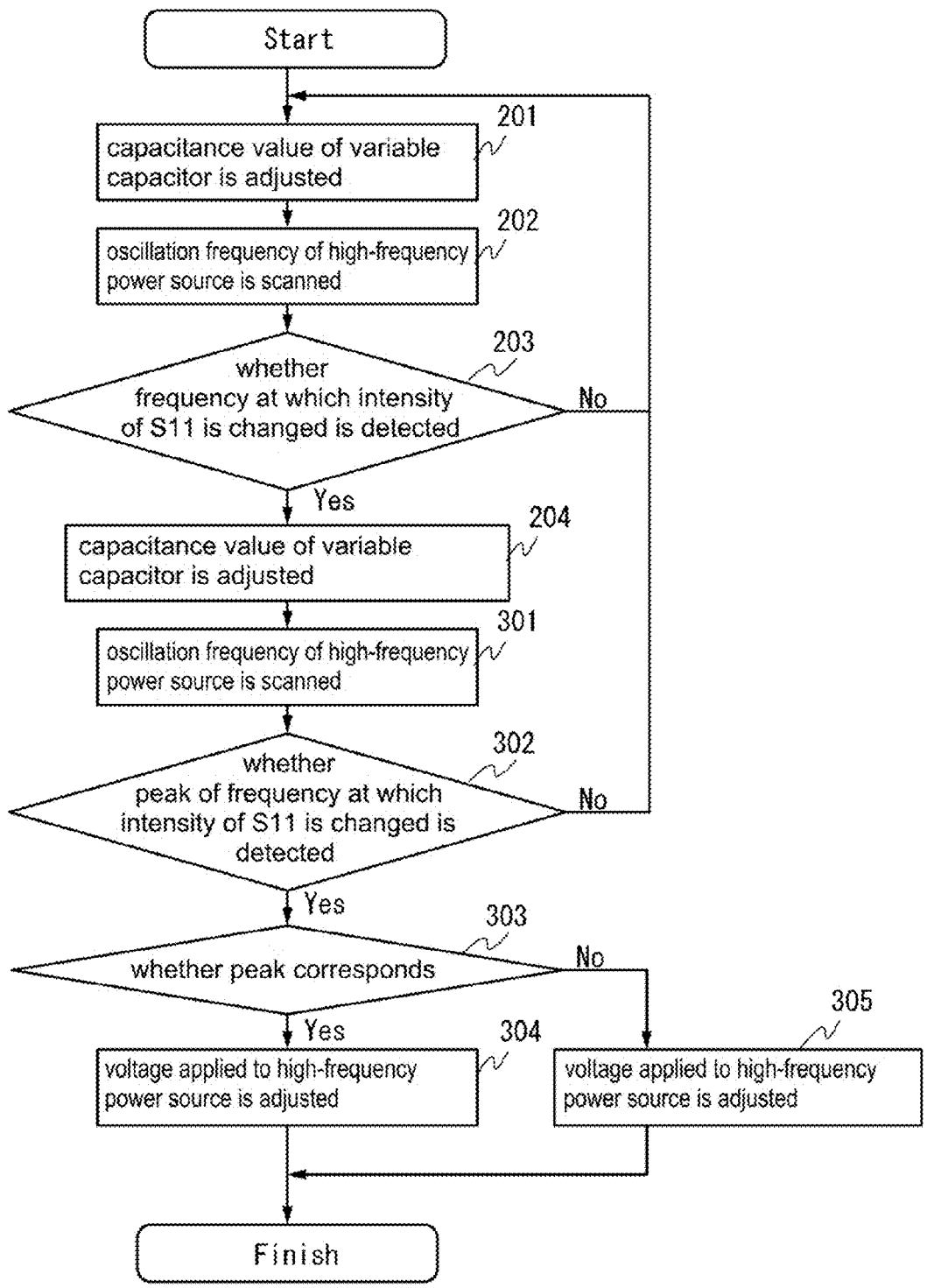
FIG. 6 illustrates a structure in Embodiment 2.

Note that Steps 201 to 204 in FIG. 6 are similar to those of the flow chart in FIG. 4 in Embodiment 1.

In Step 301 in FIG. 6, in the power transmission device 101, while the capacitance value of the variable capacitor 106 is fixed to the value adjusted in accordance with the frequency f0 that is the resonance frequency, the oscillation frequency of the high-frequency power source 104 is scanned by control with the control device 109 so that the oscillation frequency of the high-frequency power source 104 is changed successively.

In Step 302 in FIG. 6, in the power transmission device 101, whether the peak of a frequency at which the intensity of the S11 parameter is changed is detected in the control device 109 when the oscillation frequency of the high-frequency power source 104 is changed successively is determined. In Step 302, if the peak of the frequency is not detected, rearrangement of a power receiving device or the like by a user is required, and the steps are performed again from Step 201.

In Step 303 in FIG. 6, whether the peak of the frequency in Step 302 corresponds to two peaks of (f0+Δf) and (f0−Δf) that are separated from the frequency f0 detected in Step 203 is determined.

In Step 304 in FIG. 6, in the case where the number of peaks of the frequency is determined to be two in Step 303, in the power transmission device 101, voltage to be applied to the high-frequency power source 104 is adjusted by control with the control device 109 so that the frequency (f0+Δf) or the frequency (f0−Δf) is set as the oscillation frequency of the high-frequency power source 104. Note that one of the frequency (f0+Δf) and the frequency (f0−Δf) at which the intensity of the S11 parameter detected by a detector is lower is preferably used as the oscillation frequency.

In Step 305 in FIG. 6, in the case where the peak of the frequency is determined to be f0 in Step 303, in the power transmission device 101, voltage to be applied to the high-frequency power source 104 is adjusted by control with the control device 109 so that the frequency f0 is set as the oscillation frequency of the high-frequency power source 104.

According to one embodiment of the present invention, it is possible to provide a resonant wireless power transmission device in which resonance frequency matching can be performed between resonance coils of the power transmission device and a power receiving device only by a change in design of the structure of the power transmission device and the efficiency of electric power transmission can be increased and a resonant wireless power transmission system. In particular, in the structure of this embodiment, a decrease in efficiency of electric power transmission that is caused by separation of the peaks of frequency due to reduction in distance between a receiving device and a power transmission device can be suppressed while the resonance frequencies of resonance coils match each other.

This embodiment can be combined with any of the structures described in the other embodiments as appropriate.

Embodiment 3

In this embodiment, applications of the wireless power transmission system in the above embodiment are described. Note that as applications of a wireless power transmission system in the present invention, for example, portable electronic devices such as a cellular phone, a digital video camera, a computer, a portable information terminal (e.g., a mobile computer, a portable game machine, or an e-book reader), and an image reproducing device including a recording medium (specifically a digital versatile disc (DVD)) can be given. In addition, an electric propulsion moving vehicle that is powered by electric power, such as an electric car, can be given. Examples of such electronic devices are described below with reference to drawings.

Figure 7A:
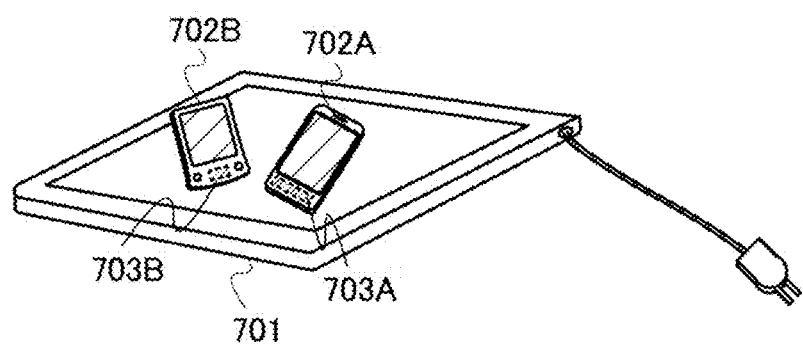
FIGS. 7A and 7B illustrate structures in Embodiment 3.

FIG. 7A illustrates an application of a wireless power transmission system to a cellular phone and a portable information terminal, and a power transmission device 701, a cellular phone 702A including a power receiving device 703A, and a cellular phone 702B including a power receiving device 703B are included. The wireless power transmission system in the above embodiment can be provided between the power transmission device 701 and the power receiving device 703A and between the power transmission device 701 and the power receiving device 703B. Thus, it is possible to provide a resonant wireless power transmission device in which resonance frequency matching can be performed between resonance coils of the power transmission device and a power receiving device only by a change in design of the structure of the power transmission device and the efficiency of electric power transmission can be increased and a resonant wireless power transmission system.

Figure 7B:
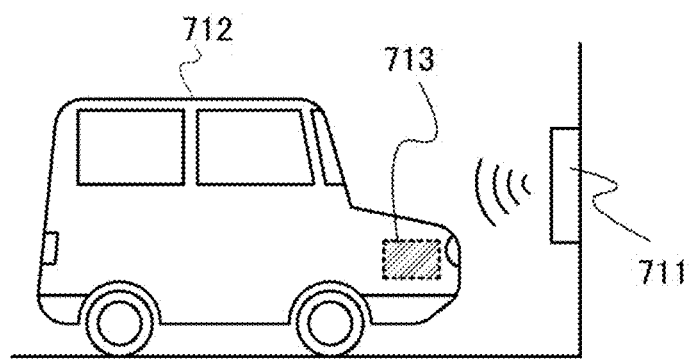

FIG. 7B illustrates an application of a wireless power transmission system to an electric car that is an electric propulsion moving vehicle, and a power transmission device 711 and an electric car 712 including a power receiving device 713 are included. The wireless power transmission system in the above embodiment can be provided between the power transmission device 711 and the power receiving device 713. Thus, it is possible to provide a resonant wireless power transmission device in which resonance frequency matching can be performed between resonance coils of the power transmission device and a power receiving device only by a change in design of the structure of the power transmission device and the efficiency of electric power transmission can be increased and a resonant wireless power transmission system.

As described above, the wireless power transmission system in the above embodiment can be used in any object that is driven with power.

This embodiment can be combined with any of the structures described in the other embodiments as appropriate.

REFERENCE NUMERALS

101: power transmission device, 102: power receiving device, 103: first coil, 104: high-frequency power source, 105: coupler, 106: variable capacitor, 107: first resonance coil, 108: detector, 109: control device, 110: memory circuit, 111: second resonance coil, 112: capacitor, 113: second coil, 114: load, 201: step, 202: step, 203: step, 204: step, 205: step, 301: step, 302: step, 303: step, 304: step, 305: step, 701: power transmission device, 702A: cellular phone, 702B: cellular phone, 703A: power receiving device, 703B: power receiving device, 711: power transmission device, 712: electric car, and 713: power receiving device.

This application is based on Japanese Patent Application serial No. 2010-263048 filed with Japan Patent Office on Nov. 26, 2010, the entire contents of which are hereby incorporated by reference.

The invention claimed is:

1. A power transmission device comprising:
   a first coil:
   a first resonance coil;
   a high-frequency power source;
   a coupler;
   a variable capacitor;
   a detector; and
   a control device,
   wherein the first coil is connected to the high-frequency power source through the coupler,
   wherein the first resonance coil is connected to the variable capacitor and is configured to be electromagnetically coupled with the first coil, and electromagnetic resonance occurs between the first resonance coil and a second resonance coil electromagnetically coupled with a second coil in a power receiving device,
   wherein the detector is configured to detect intensity of an S11 parameter output from the coupler, and
   wherein the control device is configured to change a capacitance value of the variable capacitor and an oscillation frequency of a signal output from the high-frequency power source,
   wherein the control device is configured to set the capacitance value of the variable capacitor to 0 so that a signal transmitted and received between the first coil and the second resonant coil is not influenced by the first resonant coil,
   wherein the control device is configured to set a frequency at which the intensity of the S11 parameter which is an indication of loss due to reflection of electromagnetic wave between the first coil and the second resonance coil is changed at the time when the oscillation frequency of the signal output from the high-frequency power source is changed under a condition that the capacitance value of the variable capacitor is 0, as a resonance frequency of the second resonance coil,
   wherein the control device is configured to set a resonance frequency of the first resonance coil after the capacitance value of the variable capacitor is set in accordance with the resonance frequency of the second resonance coil, and
   wherein the control device is configured to set the oscillation frequency of the signal output from the high-frequency power source as the resonance frequencies of the first resonance coil and the second resonance coil.

2. The power transmission device according to claim 1, further comprising a memory circuit in which the capacitance value of the variable capacitor for setting the resonance frequency of the first resonance coil on the basis of the resonance frequency of the second resonance coil is stored, wherein the memory circuit is connected to the control device.

3. A wireless power transmission system comprising a power transmission device and a power receiving device,
wherein the power transmission device comprising:
a first coil;
a first resonance coil;
a high-frequency power source;
a coupler;
a variable capacitor;
a detector; and
a control device,
wherein the first coil is connected to the high-frequency power source through the coupler,
wherein the first resonance coil is configured to be electromagnetically coupled with the first coil and is connected to the variable capacitor,
wherein the detector configured to detect intensity of an S11 parameter output from the coupler,
wherein the control device is configured to change a capacitance value of the variable capacitor and an oscillation frequency of a signal output from the high-frequency power source,
wherein the control device is configured to set the capacitance value of the variable capacitor to 0 so that a signal transmitted and received between the first coil and a second resonant coil in the power receiving device is not influenced by the first resonant coil,
wherein the control device sets a frequency at which the intensity of the S11 parameter which is an indication of loss due to reflection of electromagnetic wave between the first coil and the second resonance coil in the power receiving device is changed at the time when the oscillation frequency of the signal output from the high-frequency power source is changed under a condition that the capacitance value of the variable capacitor is 0, as a resonance frequency of the second resonance coil,
wherein the control device is configured to set a resonance frequency of the first resonance coil after the capacitance value of the variable capacitor is set in accordance with the resonance frequency of the second resonance coil, and
wherein the control device is configured to set a frequency at which the intensity of the S11 parameter is changed at the time when the oscillation frequency of the signal output from the high-frequency power source is changed under a condition that the capacitance value of the variable capacitor is set to a capacitance value based on the resonant frequency of the second resonance coil, as the oscillation frequency of the signal output from the high-frequency power source, and
wherein the power receiving device includes the second resonance coil which is configured to cause electromagnetic resonance with the first resonance coil and is connected to a capacitor and a second coil which is configured to be electromagnetically coupled with the second resonance coil and is connected to a load.

4. The wireless power transmission system according to claim 3,
wherein the power transmission device includes a memory circuit in which the capacitance value of the variable capacitor for setting the resonance frequency of the first resonance coil on the basis of the resonance frequency of the second resonance coil is stored, and
wherein the memory circuit is connected to the control device.

* * * * *